May 27, 1958 M. M. SMITH ET AL 2,835,920
PROCESS AND APPARATUS FOR FORMING PLASTIC MATERIALS
Filed Jan. 9, 1957
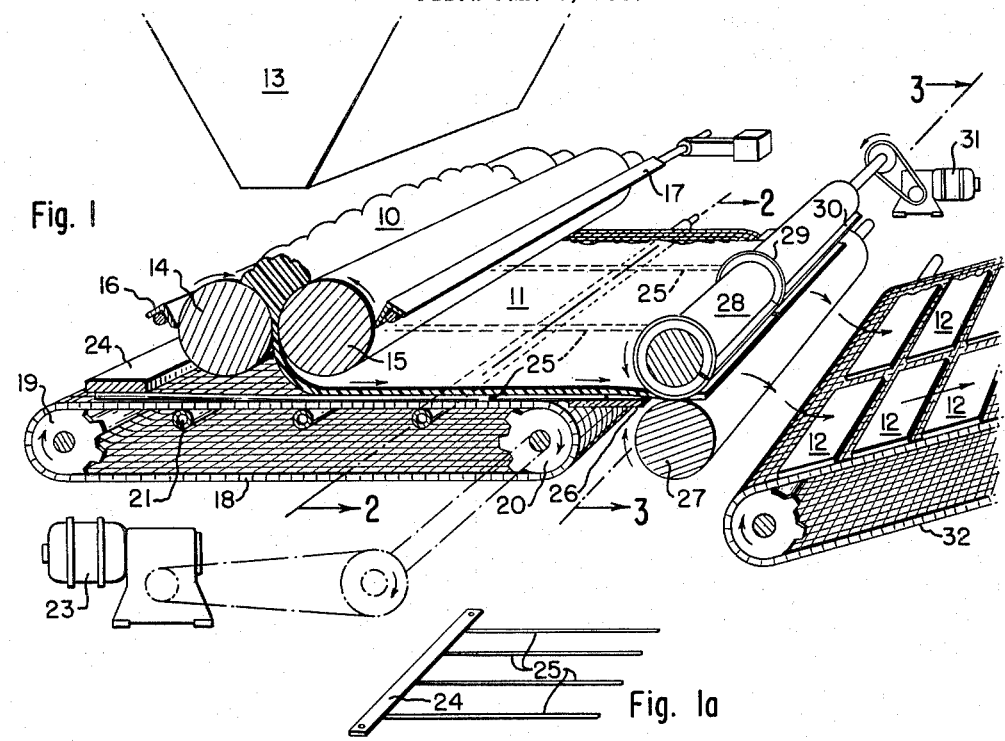
Fig. 1
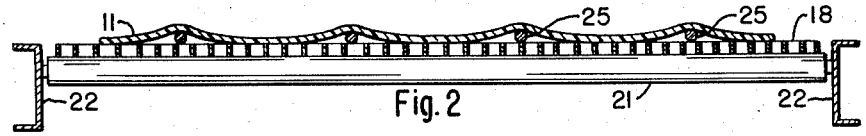
Fig. 1a
Fig. 2
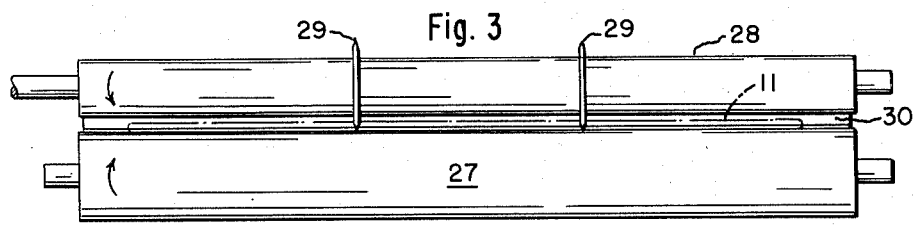
Fig. 3
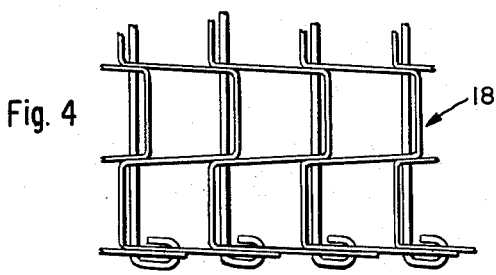
Fig. 4
INVENTORS
MERRILL M. SMITH
and WILLIAM C. BLEHER

United States Patent Office 2,835,920
Patented May 27, 1958

2,835,920

PROCESS AND APPARATUS FOR FORMING PLASTIC MATERIALS

Merrill M. Smith, Yardley, Pa., and William C. Bleher, West Roxbury, Mass., assignors, by mesne assignments, to American Biltrite Rubber Company, Inc., a corporation of Delaware Application January 9, 1957, Serial No. 633,362

10 Claims. (Cl. 18—1)

This invention comprises a new and improved process for forming and feeding sheet material in plastic condition and includes within its scope novel apparatus by which the process may be carried out.

One important field of use for the invention is in the production of terrazzo flooring where the manufacturing system requires strips or slabs of preheated plastic to be fed to a chopper or granulator. The plastic mass is milled and delivered as a hot plastic sheet of the desired thickness and at high temperature upon a conveyor arranged to carry the sheet to a series of knives operating to divide the sheet into slabs of the required dimensions, for example 25" x 5" of 0.30" in thickness.

A serious difficulty has been encountered in providing conveyor mechanism for a hot plastic sheet of this kind since it tends to penetrate the meshes of a wire screening and adhere so strongly thereto that it will not separate or fall all away from the conveyor upon reaching the knives. Such failure results in jamming of the equipment with subsequent damage to its mechanical parts and a complete interruption of the flow of plastic material in the system.

The present invention is in one aspect a complete solution of this problem. We have discovered that if the hot plastic sheet is properly supported in longitudinal zones spaced transversely so that it is caused to sag between the supported areas the sheet may be advanced in its hot plastic condition without any deformation and without objectionable adherence by applying traction to the sheet in its sagged areas between the supported zones. We have found that slider bars may be advantageously employed to hold the hot plastic away from a wire conveyor over a sufficient portion of its surface so that it will not adhere strongly to the conveyor but will fall freely from it at the proper station for further treatment such as cutting into discrete slabs of the desired dimensions.

These and other features of the invention will be best understood and appreciated from the following description of preferred apparatus for carrying out the process as illustrated in the accompanying drawing in which:

Fig. 1 is a view in perspective partly in section suggesting the apparatus in operation, Fig. 1a is a fragmentary view illustrating the arrangement of the slider bars, Fig. 2 is a view in cross section on the line 2—2 of Fig. 1, Fig. 3 is a view in elevation of the cutting mechanism, and Fig. 4 is a fragmentary view of the wire mesh conveyor.

In Fig. 1 the mass 10 of hot plastic material is represented as having been delivered from an overhead hopper 13 and as being milled and delivered as a sheet 11 from between the driven rolls 14 and 15. The roll 14 is provided with a pivotally mounted stripper blade 16 and the roll 15 similarly provided with a stripper blade 17. As the sheet 11 is formed it passes downwardly between the rolls 14 and 15 into contact with a wire mesh conveyor 18 arranged to run in a substantially horizontal path over sprocket drums or rolls 19 and 20. The upper reach of the conveyor is transversely supported by a series of spaced rolls 21 and thus maintained in its path of travel. The rolls 21 are supported at opposite sides of the conveyor by means 22 of the frame and pass transversely through the conveyor contacting only the under surface of the upper reach thereof.

The conveyor itself comprises an endless band of wire mesh, preferably of intermeshing links as shown in Fig. 4, and adapted by reasons of its construction to handle a sheet that may have a temperature as high as 300°–375° F. The conveyor is herein shown as driven by a motor 23 having belt connections with the shaft of the roll 20 and so operating to draw the active portion of the conveyor forwardly toward its delivery end at the right in Fig. 1. A pulling, rather than pushing, feeding impulse is thus imparted to the hot plastic sheet 11.

As shown herein the apparatus includes a stationary transverse bridge 24 located just above the receiving end of the conveyor 18 and behind the roll 14. Forwardly from the bridge extends a series of slider bars 25. They are fast at their rear ends to the bridge 24 and disposed just above the active surface of the conveyor and in uniform transverse spacing as shown in Fig. 2. At their forward ends the bars 25 rest upon an apron 26 which is disposed tangentially with respect to the conveyor where it later passes in its circular path about the driven sprocket roll 20. The bridge and apron may be supported in any convenient manner upon the frame of the apparatus at opposite sides of the conveyor.

It will be apparent that the slider bars are located between the sheeting rolls 14, 15 and the active portion of the conveyor and the sheet 11 is delivered by the rolls in supported condition upon the bars although allowed to sag between them into traction contact with the conveyor 18. The bars may be circular in cross section or half round.

The apron 26 leads from the conveyor to a pair of cutting rolls 27 and 28. Of these the upper roll carries circular stripping knives 29 and a straight fly knife 30 and is driven by a motor 31 through siutable belt or chain connections. The lower roll 27 serves as a platten or anvil for the knives of the driven roll. As the sheet 11 passes beyond the apron 26 it is divided into separate slabs 12 and these fall as cut upon a second conveyor 32 by which the are carried to the next station in the manufacturing system. The stripping knives 29 are arranged as shown in Fig. 3 to divide the sheet 11 into three strips and of these only two are shown in Fig. 1.

The slabs 12 may be cut to size appropriate for their intended use. In some cases the slabs may be of such composition that they may be employed directly as floor or wall coverings. Again the slabs may be of ornamental coloring and reduced to granular form for incorporation in plastic flooring of the terrazzo type.

Having thus disclosed our invention and described in detail suitable apparatus for carrying out our novel process, we claim as new and desire to secure by Letters Patent:

1. The process of feeding sheets of soft plastic material which is characterized by supporting the sheet in longitudinal zones spaced transversely, causing the sheet to sag between said supported zones and applying traction to the sheet in its sagged areas between its supported zones.

2. The process of converting a plastic mass into discrete slabs of sheet material which comprises the steps of milling the plastic mass between rolls and depositing it as a continuous flexible sheet supported in spaced parallel zones below which the sheet sags, advancing the sheet by traction applied to its sagging areas between its supported zones, and cutting the sheet in a direction transverse to its said supported zone.

3. The process of feeding sheets of flexible plastic material, which is characterized by the steps of supporting the sheet from underneath by a series of stationary spaced members, allowing the sheet material to sag between said supporting members, and applying traction to the under surface of the sheet in its sagged areas.

4. The process of feeding sheets of flexible uncured plastic material characterized by first imparting to the sheet a series of uniformly spaced longitudinal undulations, and then applying traction only to the downwardly directed crest areas of the undulations.

5. The process of feeding flexible sheets of uncured thermoplastic material comprising the steps of supporting the sheet in spaced longitudinal lines all disposed at the same level, causing intermediate portions of the sheet to sag in undulations extending below the said lines of support, and applying traction to the sagged areas of the sheet at a level below the said lines of support.

6. Apparatus for forming and feeding flexible plastic sheets, comprising a pair of milling rolls, a conveyor movable in a plane beneath the rolls, and a series of stationary supporting rods extending above the surface of the conveyor in position to lie between the conveyor and a sheet delivered by the milling rolls.

7. Apparatus for feeding hot flexible plastic sheets, comprising a wire mesh conveyor, and a series of stationary transversely spaced rods extending longitudinally above the conveyor and in close proximity to its upper surface and acting to support a sheet in partial contact with the conveyor.

8. Apparatus for feeding and cutting hot flexible plastic sheets, comprising a conveyor movable in a substantially horizontal path, parallel supporting rods substantially coextensive with the conveyor acting partially to support a sheet otherwise engaged by the moving conveyor, and knives located adjacent to the ends of said rods for cutting the sheet after it passes beyond the rods.

9. Apparatus for feeding hot flexible plastic sheets, comprising a metallic conveyor movable in a substantially horizontal path, a bridge spanning the conveyor adjacent to its receiving end, and a series of rods spaced transversely above the conveyor and secured at their rear ends to said bridge.

10. Apparatus as described in claim 9 in which an apron spans the conveyor adjacent its delivery end and the rods extend between the bridge and said apron in proximity to the surface of the conveyor.

References Cited in the file of this patent

UNITED STATES PATENTS

| | | |
|---|---|---|
| 644,810 | Sylvester | Mar. 6, 1900 |
| 2,427,223 | Moore | Sept. 9, 1947 |
| 2,549,202 | Idelman | Apr. 17, 1951 |